(12) United States Patent
Remole

(10) Patent No.: US 7,040,635 B1
(45) Date of Patent: May 9, 2006

(54) PORTABLE WHEELED DOLLY FOR CARRYING RECEPTACLE OF ARTICLES AND COLLAPSIBLE CHAIR

(76) Inventor: Bradford D. Remole, 1650 Murdoch Rd., Marietta, GA (US) 30062

( * ) Notice: Subject to any disclaimer, the term of this patent is extended or adjusted under 35 U.S.C. 154(b) by 205 days.

(21) Appl. No.: 10/714,372

(22) Filed: Nov. 17, 2003

Related U.S. Application Data

(63) Continuation-in-part of application No. 10/682,287, filed on Oct. 10, 2003.

(51) Int. Cl.
- B62B 1/00 (2006.01)
- B62B 5/00 (2006.01)
- A47K 1/04 (2006.01)
- A47C 4/00 (2006.01)
- A47D 1/02 (2006.01)

(52) U.S. Cl. .................. 280/47.18; 280/47.25; 280/645; 280/652; 280/79.2; 248/129; 297/16.1; 297/60

(58) Field of Classification Search .......... 280/245, 280/651, 652, 47.24, 47.25, 47.26, 47.131, 280/30, 62, 63, 47.33, 43, 43.1, 79.2, 47.18; D34/18, 24, 26; 248/127, 129, 149; 297/16.1, 297/16.2, 25, 59, 60, 440.1, 440.24
See application file for complete search history.

(56) References Cited

U.S. PATENT DOCUMENTS

| | | | | |
|---|---|---|---|---|
| 2,784,004 A * | 3/1957 | Hamrick, Jr. | ................. | 280/30 |
| 2,991,035 A * | 7/1961 | Puckett | ....................... | 248/155 |
| 3,997,213 A * | 12/1976 | Smith et al. | ................. | 297/118 |
| 4,355,818 A * | 10/1982 | Watts | ........................... | 280/654 |
| 4,521,030 A * | 6/1985 | Vance | ........................... | 280/42 |
| 4,887,837 A * | 12/1989 | Bonewicz et al. | .......... | 280/654 |
| 5,161,811 A * | 11/1992 | Cheng | ........................... | 280/30 |
| 5,213,360 A * | 5/1993 | Lin | ............................. | 280/648 |
| 5,306,027 A * | 4/1994 | Cheng | ........................... | 280/30 |
| 5,338,054 A * | 8/1994 | Imai et al. | ................... | 280/655 |
| 5,695,246 A * | 12/1997 | Tsai | ............................ | 297/335 |
| 5,823,894 A | 10/1998 | Actor | | |
| 5,971,333 A | 10/1999 | Fiedor | | |
| 6,000,713 A * | 12/1999 | Lin | ............................. | 280/647 |
| 6,082,757 A * | 7/2000 | Lin | ............................. | 280/654 |
| 6,131,925 A * | 10/2000 | Weldon | ....................... | 280/30 |
| 6,179,306 B1 * | 1/2001 | Maxwell | .................. | 280/47.26 |
| 6,196,560 B1 * | 3/2001 | Ohlsson | ...................... | 280/30 |
| 6,213,574 B1 | 4/2001 | Pierce | | |
| 6,435,990 B1 | 8/2002 | Bradley | | |
| 6,825,425 B1 * | 11/2004 | Perry | .......................... | 177/126 |

* cited by examiner

*Primary Examiner*—Christopher P. Ellis
*Assistant Examiner*—Gerald B Klebe
(74) *Attorney, Agent, or Firm*—William B. Noll

(57) ABSTRACT

A portable wheeled dolly for transporting a receptacle of articles, such as a quantity of baseballs to a practice field, where the dolly comprises a pair of spaced apart, elongated frame members, and a U-shaped handle engaging respective first ends of said frame members. Hingedly positioned along a midpoint of the of the frame members is a pivotal platform which functions as a transporting support surface for the receptacle, or as a seat in a static mode. A pair of wheels are provided in proximity to the second ends of the frame members, where the wheels are vertically spaced from the second ends to avoid ground contact in the static mode, but in rolling contact in the transporting mode.

8 Claims, 5 Drawing Sheets

PORTABLE WHEELED DOLLY FOR CARRYING RECEPTACLE OF ARTICLES AND COLLAPSIBLE CHAIR

RELATED APPLICATION

This application is a continuation-in-part of Ser. No. 10/682,287, filed Oct. 10, 2003, under the title, "Portable Wheeled Vehicle for Carrying Receptacle of Articles and Convertible Chair", by the inventor hereof, where the contents thereof are incorporated herein in its entirety.

FIELD OF THE INVENTION

This invention is directed to the field of portable wheeled dollys for receiving a receptacle for transporting selected articles, more particularly to a wheeled dolly for carrying a receptacle for use by baseball coaches in transporting baseballs to a field to facilitate the coach's teaching of basic baseball fundamentals.

BACKGROUND OF THE INVENTION

The invention preferably relates to a portable, wheeled dolly receiving a receptacle for transporting quantities of baseballs to a practice field by a coach, for example. Additionally, the receptacle includes a collapsible chair to allow the coach to rest while teaching the baseball fundamentals.

While the portable wheeled dolly carrying a receptacle of this invention is submitted to have broad application in transporting a variety of articles, the further description will be, for convenience, directed to the preferred use thereof as a device for assisting a baseball coach in transporting dozens of baseballs to a practice field. For an effective practice, it is imperative that sufficient equipment be provided to the many players to ensure the proper honing of their throwing, fielding and batting skills.

Baseball and softball players spend a great deal of time practicing and developing their batting skills by swinging at balls that are thrown at a relatively high speed. This form of training requires a pitcher or coach to repetitiously throw a large number of balls from the pitcher's mound to the catcher behind the batter and home plate. Thus, it is desirable to have a baseball dispenser that is capable of holding a large quantity of balls, offering easy access to the quantity of balls, while providing a convenient means to transport the balls after practice. Baseball practice aids, such as batting aids, have been developed over the years, as exemplified by U.S. Pat. No. 5,823,894 to Actor, and U.S. Pat. No. 6,435,990 to Bradley. However, only a limited number of aids were discovered for providing baseball or article dispensers to hasten and facilitate batting practice, for example. Two of the latter dispensing devices are found in the following U.S. Patents:

a.) U.S. Pat. No. 5,971,333, to Fiedor, discloses a movable self supporting tool implement stand, for the movement of articles, having a means for separating, holding and storing tool implements in the vertical position, and a mobility means for the articles is provided for permitting desired movement of the implement stand to and from and across a work area. The stand accomplishes this with a structure comprising an outer peripheral shell frame and an inner fixed tubular frame having top and bottom surfaces disposed thereon. The outer peripheral shell frame may be a cylindrical bucket and the inner fixed tubular frame is completely removable therefrom to provide a free standing movable self supporting tool implement stand with a separate free standing bucket that may be used at the job sight.

b.) U.S. Pat. No. 6,213,574, to Pierce, discloses a baseball dispenser for storing and dispensing a ball, where the dispenser comprises a cylindrical container which has an interior sized to hold a large supply of baseballs, softballs, and the like, and an opening at its top for receiving balls into the interior thereof. The baseball dispenser has a pair of handles secured to the upper end of the container and a pair of wheels rotatably mounted to the lower end thereof for facilitating easy transportation across the surface of the ground. One or more support columns extend vertically from the bottom of the container, wherein a compression spring is disposed about each of the support columns. A circular platform is vertically slidably disposed within the container and is engaged with the support columns such that the compression springs are constrained axially between the bottom of the container and the platform. The support columns serve to guide the platform as it travels in a vertical path along the interior of the container, and at the same time, the compression springs serve to automatically elevate the platform to a level at which the balls located on the top can readily be grasped for use as the balls are removed from the container.

The prior art clearly recognizes the importance of providing teaching aids and other devices that can facilitate the training and improvement of the playing skills of athletes, especially for large team sports where plural activities are conducted simultaneously. Baseball is a good example where many players must be kept active, and a large quantity of balls are used. Only the patent to Pierce offers the teaching staff the opportunity to transport this large quantity of balls. However, it falls short in providing the training staff, i.e. coaches, the freedom of easily transporting the balls, while also giving them the opportunity to sit and lecture the players, when appropriate. The manner by which this invention offers these advantages to the coaches will become more apparent in the following description, particularly when read in conjunction with the accompanying drawings.

SUMMARY OF THE INVENTION

This invention is directed to a portable, light-weight, receptacle carrying dolly, more precisely to such dolly that includes a convertible, platform that doubles as a receptacle transporting support, then as a seat after removal of the receptacle. For storage, the platform may be pivoted to its inoperative position against the vehicle frame. The portable dolly hereof, in a preferred embodiment, comprises a pair of parallel, vertically oriented frame members, where the members are tubular in configuration and are fixed in the length of the frame. The upper members, at the respective free ends thereof, include a transverse support member that doubles as a transporting handle. The free ends of the lower frame members mount a rotatable wheel, vertically offset from the free ends, for ease of moving and transporting the vehicle. At a midpoint of the vertically oriented frame members is a pivotally mounted frame, having a planar member that functions to support the carried receptacle during a transporting mode, and as a seat in an idle mode. The pivotally mounted frame includes a pair of Z-shaped brackets, with a first leg thereof mounted to a respective vertical oriented frame member. A second leg of the Z-shaped brackets mounts a pivotal sleeve or axle on which the planar member is fixed. In a preferred embodiment, the forward sides of the pivotally mounted frame are angled toward one another, where the midpoint of the planar member, between the forward sides, further mounts a pair of brackets free to which is mounted a pivotal leg, especially for supporting the weight of a seated individual. The upper surface of the planar member may include one or more embossed ribs to help in supporting the receptacle, especially when used in a transporting mode. In a transporting mode, the pivotally mounted frame is lowered and a suitably sized receptacle is placed thereon and held on the planar member, such as by elastic type straps, as known in the art, and by the one or more embossed ribs. In a static mode, the training staff may easily access the contents of the receptacle to carry out their training functions. When the dolly is needed as a seat, the receptacle is removed to expose the planar member for comfortably seating the individual. Finally, in this static mode, the vertically offset wheels are off the ground to ensure stability of the dolly.

Accordingly, a feature of this invention is the provision of a portable, light-weight, wheeled dolly suitable for transporting articles, while doubling as a seat in a static mode.

Another feature hereof lies in the use of a support frame that may be pivoted to a closed position allowing for easy and compact storage.

Still another feature of the invention is a baseball training aid to allow a coach or assisting personnel the convenience of retrieving baseballs from an elevated receptacle and avoid unnecessary back sprain associated with repeated bending.

These and other features of the invention will become clearer to those skilled in the art, especially on reading the specification and drawings which follow.

DETAILED DESCRIPTION OF PREFERRED EMBODIMENT

Figure 1:
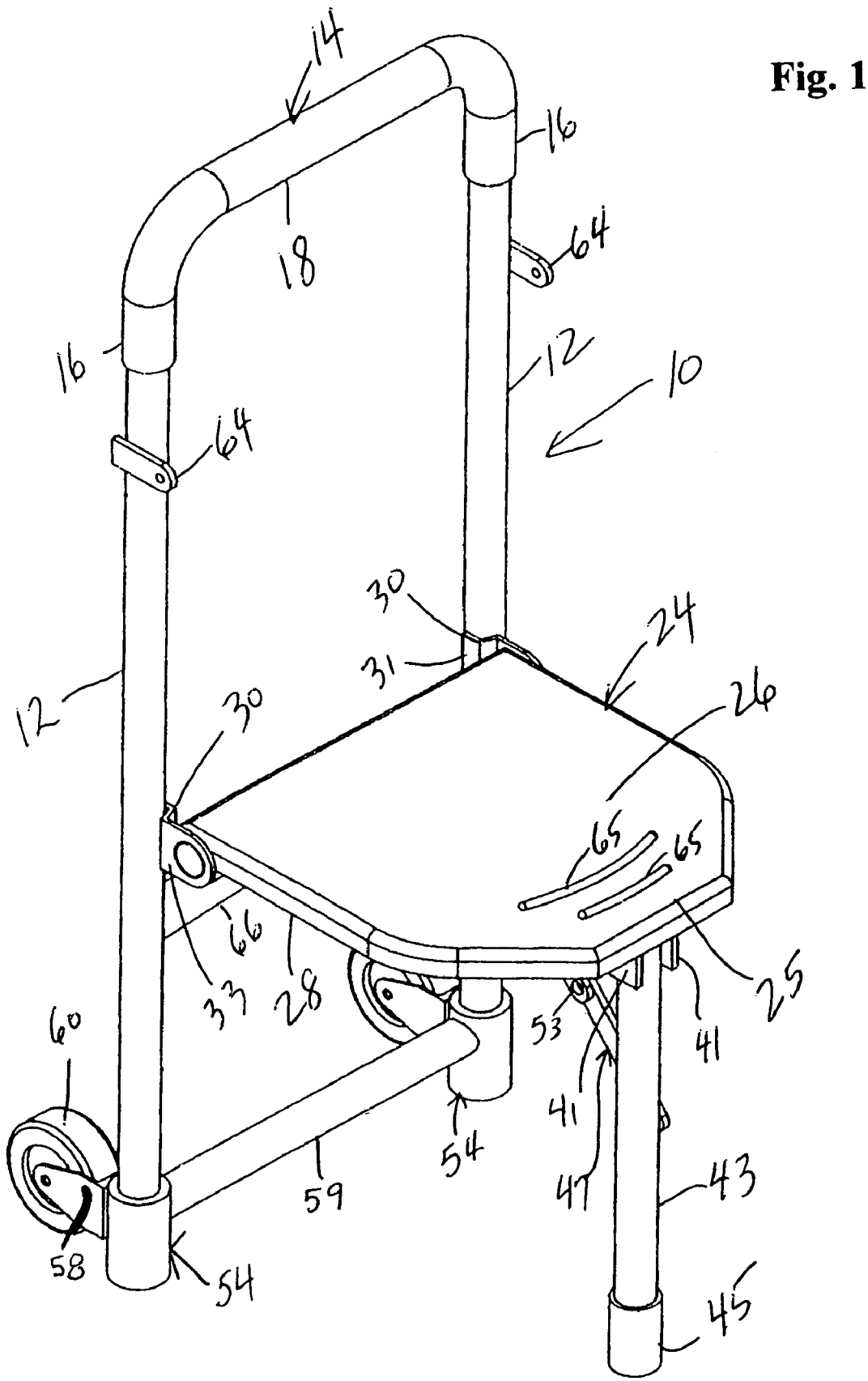
FIG. 1 is a perspective view of the portable wheeled dolly of this invention, without the intended receptacle of baseballs, or other articles, where the dolly is shown in a static mode with the receptacle removed, revealing the convertible and collapsible chair.
Figure 2:
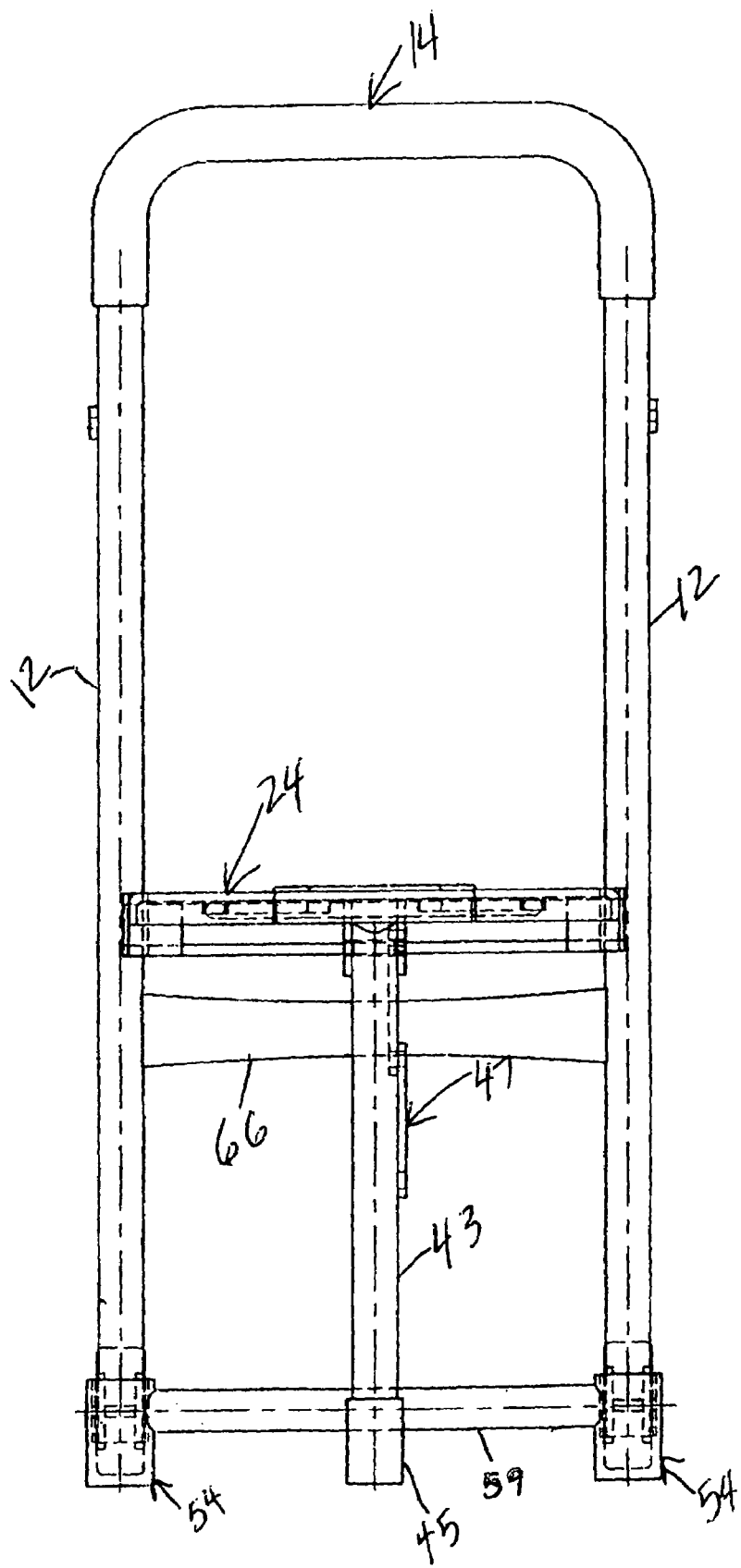
FIG. 2 is a front view thereof, with parts shown in phantom to reveal internal certain details.
Figure 3:
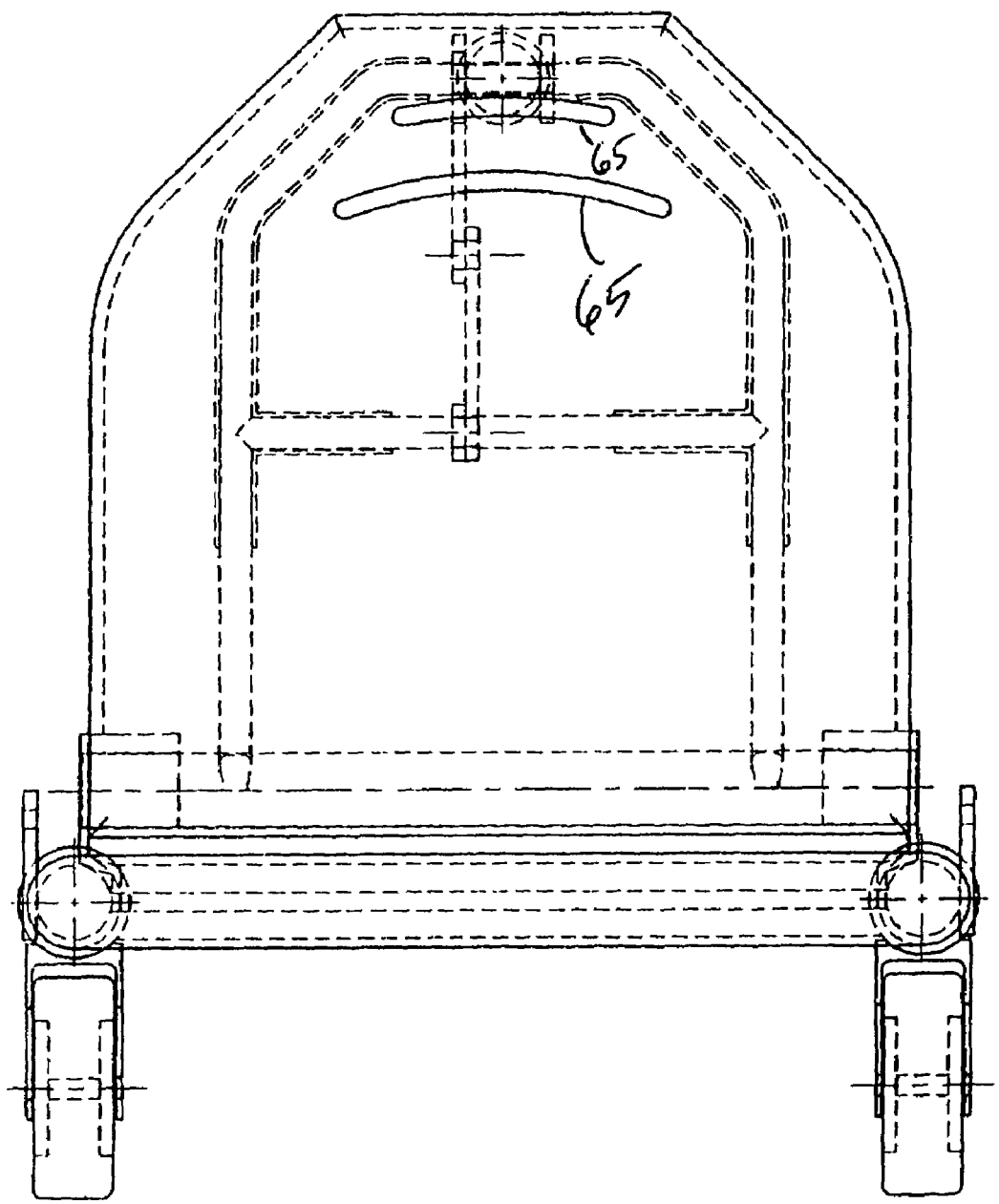
FIG. 3 is a top view of the portable wheeled dolly of FIGS. 1 and 2, with hidden parts shown in phantom.

The present invention relates to a portable, wheeled dolly for receiving a receptacle in transporting articles, such as a quantity of baseballs, to selected locations, where the receptacle may be removed and the dolly converted to a seat. In a storage mode, the dolly may be folded into a compact article. The invention hereof will now be described with regard to the several Figures, where like reference numerals represent like components or features throughout the various views.

Turning now to FIGS. 1–5, illustrating a preferred embodiment for the wheeled article carrying dolly of the invention, the wheeled dolly 10 comprises first and second frame members 12, spaced apart and generally parallel to one another, where the frame members are preferably tubular and circular or rectangular in cross-section. The frame members 12 are joined together at the top by a U-shaped handle member 14, where the handle member consists of a pair of free legs 16, sized for sliding engagement with the respective first and second frame members 12, and a cross leg 18 joining the free legs 16, where the cross leg functions as a convenient handle for transporting the wheeled dolly 10. The free legs 16 and frame members 12 may be permanently or temporarily fixed to one another by mechanisms as known in the art.

Figure 4:
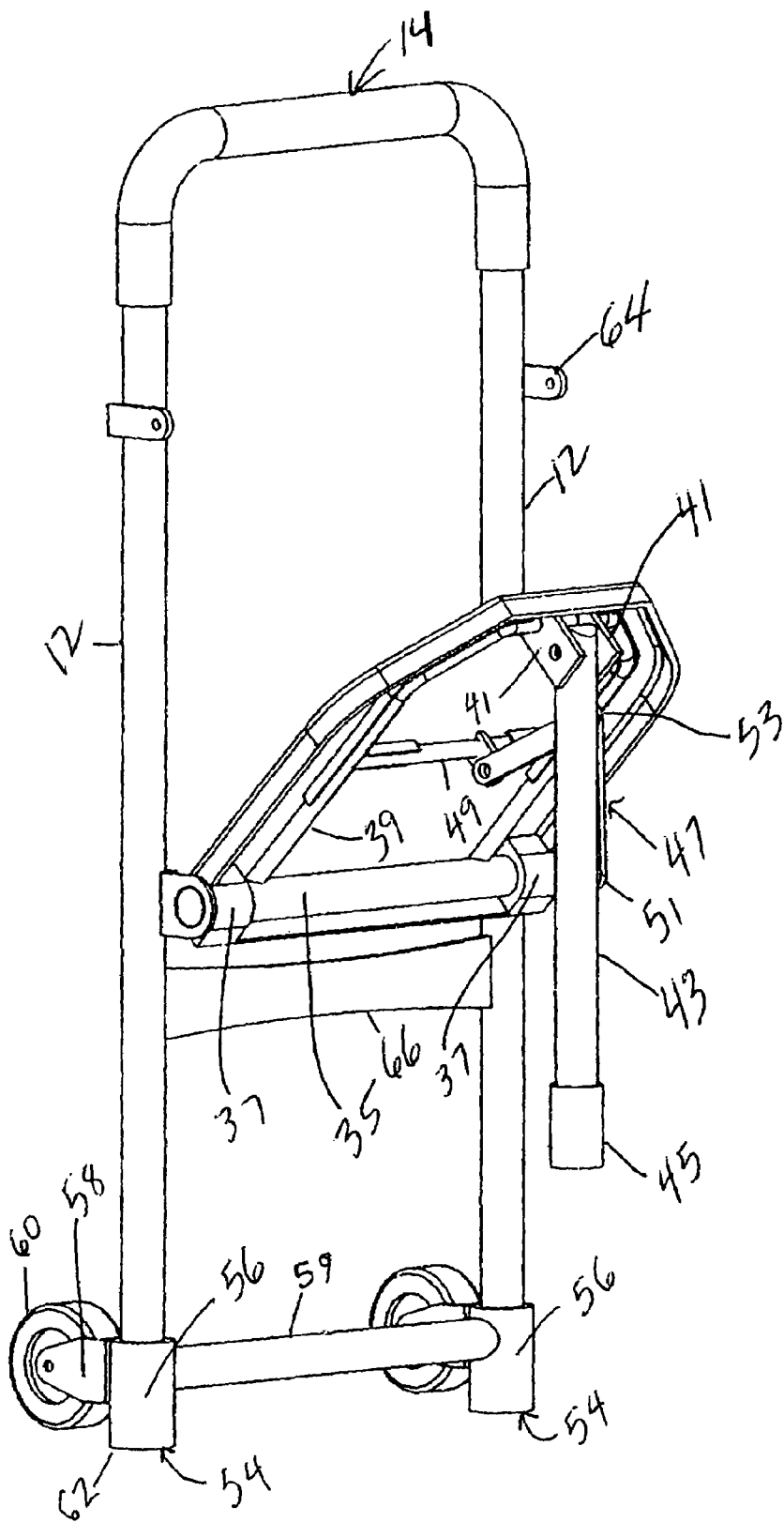
FIG. 4 is a perspective view of the wheeled dolly of this invention, less the receptacle, showing the wheeled dolly in a partially folded position for conveniently moving the wheeled dolly to selected locations, then repositioning same for seating.

To fixedly space the first and second frame members apart, a pivotal platform 24 is positioned at midpoints, i.e. elevated, along the spaced apart frame members 12. The pivotal platform 24, preferably triangular in shape, at least at the front end 25 thereof, comprises a planar plate 26 with angled, downwardly extending, peripheral frame supports 28. The planar plate 26, adjacent the frame members 12, is provided with and secured to a pair of Z-shaped brackets 30, where a first leg 31 is fixedly secured to a respective frame member 12, and a second leg 33 mounting a cylindrical sleeve or axle 35 extending between supports 37, as best seen in FIG. 4. The supports 37 are secured to the underside of planar platform 24 and are pivotal therewith. As best observed in FIGS. 2 and 4, the planar platform 24 is provided with a generally U-shaped under support member 39. Further, extending downwardly from the planar platform 24 in proximity to the front end 25 are a pair of spaced apart brackets 41 for pivotally mounting a support leg 43, as hereinafter described.

Figure 5:
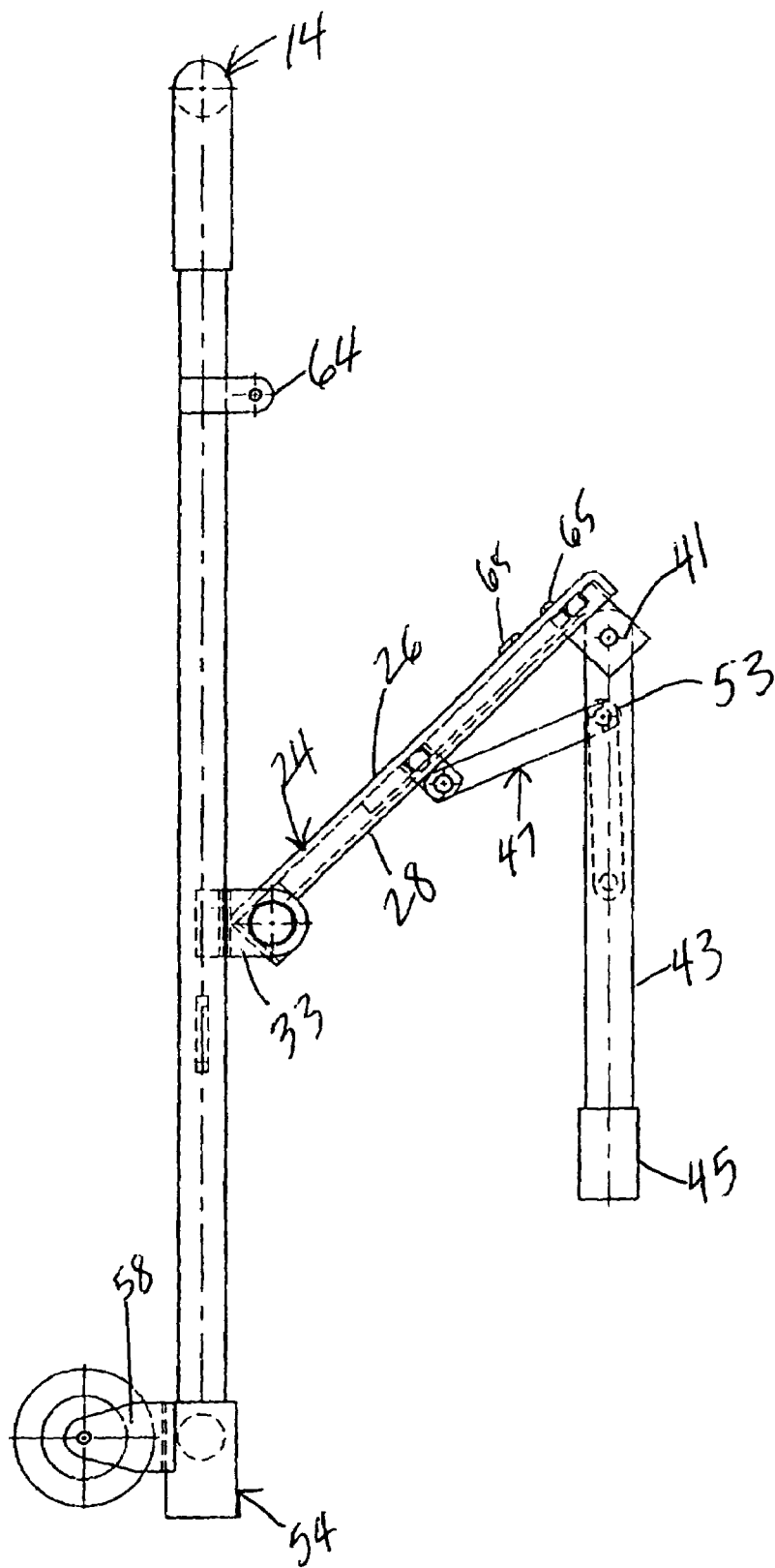
FIG. 5 is a side view of the partially folded dolly of FIG. 4.

As best seen in FIGS. 4 and 5, the support leg 43 is pivotally mounted between the brackets 41, from a fully folded position in essential contact with the underside of planar platform 24 to a fully extended transporting or seating position, see FIG. 1. For stability, the support leg may include a broadened, closed foot member 45 to prevent its sinking into any loose ground. To temporarily secure the support leg 43 from collapsing, a two-part hinged locking arm 47 is provided. The hinged locking arm, as seen in FIG. 5, is pivotally secured to a cross member 49 extending at a midpoint between the free arms of the U-shaped support member 39. The opposite end 51 is pivotally mounted to the side of support leg 43. In the fully extended position of FIG. 1, the two-part hinged locking arm is straight and will be locked against movement, by means known in the art. To release the support leg 43 from the position of FIG. 1, one merely presses against the hinge point 53 and moves the support leg 36 against the underside of planar platform 24.

FIG. 1 best illustrates the transporting mode for the wheeled dolly 10 of this invention. That is, the extended planar platform 24 removably receives a receptacle, which for purposes of illustration may be seen in the parent co-pending application. To convert the wheeled dolly to a seat, one merely removes the receptacle. An alternate mode for the wheeled dolly 10 is partially illustrated in FIGS. 4 and 5. Here the planar platform is shown in a partially folded position, where only completion of the pivoting will result in a very compact device. The latter may be described best as a storage mode.

Further, to facilitate easy transportation of the dolly 10, the opposite or lower ends 54 of frame members 12 are provided with a broadened, closed foot members 56 and a transverse support 59 extending therebetween. In this regard for transport stability, the upper surface of planar plate 26 may be provided with one or more embossed ribs 65 to minimize shifting of the receptacle. Additionally, each said lower end of a respective frame member 12 is provided with a U-shaped bracket 58 having a wheel 60 mounted for rotation between the arms of the bracket 58. Note that the brackets 58 are spaced vertically from said lower ends 54 so as not to interfere with the set up of the dolly in seating position of FIG. 1. However, in transporting the dolly, particularly over a rough terrain, when the dolly is angled backward, the wheels will contact the terrain and easy movement is accomplished.

Since transporting may likely occur over rough terrain, as noted above, the upper ends of the respective frame members may include a bracket 64 to which may be temporarily secured a strap or cord extending about any receptacle loaded thereon. In use, the baseballs or other articles being transported, being situated in an elevated position, are readily available to the coach or other personnel, but when removed may become an instant seat. Finally, for added stability, the spaced apart frame members 12 may be provided with a cross member 66, particularly below the pivotal planar platform.

It is understood that changes, variations and modifications may be made to the wheeled vehicle of this invention, especially by those skilled in the art, without departing from the spirit and scope of the invention. Accordingly, no limitation is intended to be imposed thereon except as set forth in the accompanying claims.

I claim:

1. A portable wheeled dolly for transporting a receptacle of articles, with a convertible chair, said wheeled dolly comprising:
   a.) a frame composed of a pair of spaced apart tubular, elongated members with a U-shaped handle member having a pair of free legs for engagement with a first end of said tubular members;
   b.) said elongated members having second ends joined together by a fixed bracing support, said second ends further provided with rotatable wheels spaced vertically along said elongated members, with said wheels being spaced from a rolling surface in an upright and static mode;
   c.) a pivotal platform hingedly mounted to said tubular members along a midpoint of said tubular members, said pivotal platform mounting a pivotal leg remote from said tubular members and extendable from a position adjacent to said platform to a position perpendicular thereto, said pivotal platform supportable at said midpoint by said pivotal leg in said position perpendicular to said pivotal platform, said platform functioning to removably retain said receptacle when used in a transporting mode, and a chair when used in said upright and static mode.

2. The portable wheeled dolly according to claim 1, wherein means are provided to secure said U-shaped handle to said tubular members.

3. The portable wheeled dolly according to claim 1, wherein said pivotal leg includes a cap to override a free end of said pivotal leg.

4. The portable wheeled dolly according to claim 3, including locking means to secure said pivotal platform in said static mode.

5. The portable wheeled dolly according to claim 4, wherein said locking means comprises a pair of pivotal arms with a first arm pivotally mounted to said pivotal platform and a second arm pivotally mounted to said pivotal leg.

6. The portable wheeled dolly according to claim 4, wherein said pivotal platform comprises a planar member that functions as the supporting surface for said receptacle, a downwardly extending side wall, and a U-shaped support frame within said side walls and secured to the underside of said planar member.

7. The portable wheeled dolly according to claim 6, wherein said underside further includes a pair of spaced apart brackets for pivotally mounting said pivotal leg.

8. The portable wheeled dolly according to claim 6, wherein the transporting surface of said planar member includes at least one embossed rib to facilitate securement of said receptacle when using said dolly in a transporting mode.

* * * * *